United States Patent [19]

Thistleton

[11] 4,321,986

[45] Mar. 30, 1982

[54] BRAKE ACTUATORS

[75] Inventor: John S. Thistleton, Bournville, England

[73] Assignee: Lucas Industries Limited, Birmingham, England

[21] Appl. No.: 90,973

[22] Filed: Nov. 5, 1979

[30] Foreign Application Priority Data

Nov. 7, 1978 [GB] United Kingdom ............... 43526/78

[51] Int. Cl.³ ............................................. F16D 65/56
[52] U.S. Cl. ............................. 188/196 F; 188/71.9; 188/72.8
[58] Field of Search ................. 188/196 F, 71.9, 71.8, 188/196 BA, 196 B, 196 V, 198–203, 196 D, 72.7, 72.8, 79.5 K

[56] References Cited

U.S. PATENT DOCUMENTS 3,848,705  11/1974  Burnett ...................... 188/196 F X
4,162,720  7/1979  Haraikawa ........................ 188/71.9

FOREIGN PATENT DOCUMENTS 1492391  11/1977  United Kingdom .
1492392  11/1977  United Kingdom .

Primary Examiner—Douglas C. Butler
Attorney, Agent, or Firm—Scrivener, Clarke, Scrivener and Johnson

[57] ABSTRACT

A mechanical brake actuator comprises an output tappet (3) in screw-threaded engagement with a sleeve (7). In normal use, rotation of an operating member (17) by a rod or cable leads to axial advancement of the tappet (3) and sleeve (7) as a unit. Adjustment for wear is provided by rotating the sleeve (7) relative to the tappet (3) if, after a predetermined amount of rotation of operating member (17), the torque required to turn the sleeve (7) is below a predetermined value T. This is achieved by an adjuster comprising an input ring (25) coupled to an output member (29) by a torsion spring (28). The input ring (25) is coupled to operating member (17) by a lost motion connection (23,24) and output member (29) is coupled to sleeve (7) by a one-way clutch (30). After an amount of rotation of the operating member (17) predetermined by the lost motion connection (23,24) the operating member (17) entrains the input ring (25). Spring (28) is pre-loaded to transmit torque T without deforming and accordingly if at this point adjustment is necessary the sleeve will be rotated. If no adjustment is needed the spring (28) will wind up.

10 Claims, 8 Drawing Figures

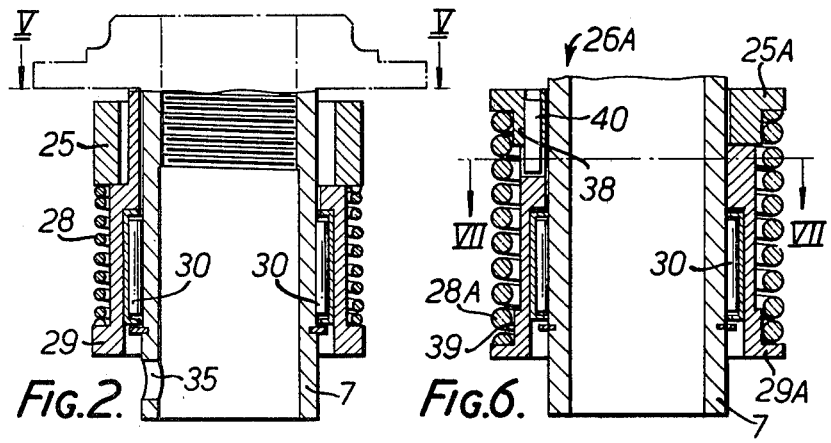
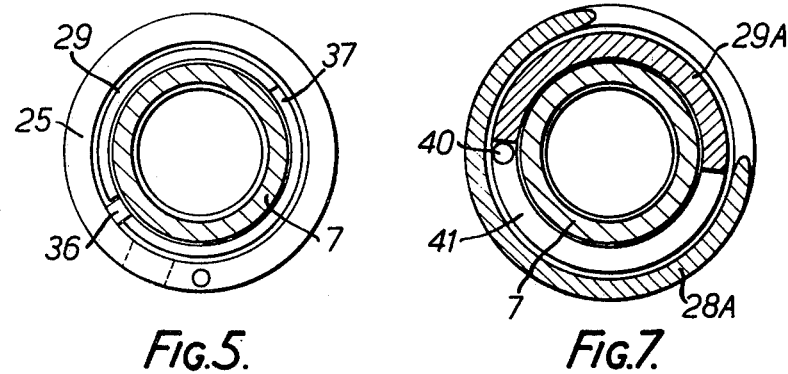
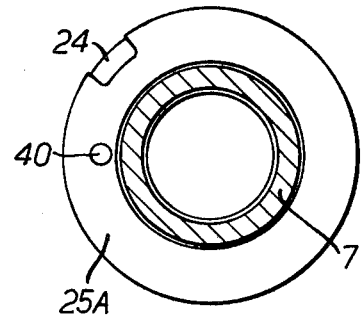

BRAKE ACTUATORS

This invention relates to a brake actuator, and more particularly to a brake actuator suitable for use in a mechanically applied disc brake and incorporating an automatic slack adjuster.

Our British Patent Specifications No. 1,492,391 and 1,492,392 describe two embodiments of mechanically actuated disc brake assemblies. In both assemblies an automatic slack adjuster is provided in order to maintain the clearance between the surface of the friction pads and the disc substantially constant regardless of friction material wear.

In order to prevent over adjustment due to caliper distortion during periods of heavy brake application, the adjuster mechanisms of the brake assemblies described in the above specifications include friction clutches which slip when the amount of torque required to rotate the nut member relative to the screw member exceeds a predetermined value. Such clutches have not proved entirely satisfactory since the slip torque of the clutch is fairly critically dependent upon the overall dimensions of the clutch components, and these dimensions are difficult to maintain to within accurate tolerances at reasonable cost. Even if the clutches initially operate satisfactorily, the relative slipping between the clutch surfaces leads to wear and in turn to variations in the slip torque. The situation is aggravated by the ingress of road dirt and moisture. Accordingly, the slip clutch is inherently expensive and difficult to manufacture, and can prove unsatisfactory in use.

According to one feature of the present invention there is provided a brake actuator comprising: an output tappet fixed against rotation and having a screw-threaded stem; a sleeve member having an axial screw-threaded bore in screw-threaded engagement with the stem of the output tappet; an operating mechanism comprising a fixed member and a movable member which, upon rotation relative to the fixed member, applies an axial force to the sleeve member to axially advance the sleeve member and the output tappet as a unit; and an adjusting mechanism for rotating the sleeve member relative to the output tappet and thereby advancing the output tappet relative to the sleeve member, the adjusting mechanism including a spring one end of which is movable by the movable member of the operating mechanism and the other end of which is coupled to the sleeve via a one-way clutch capable of driving the sleeve in the direction tending to advance the tappet.

With such an arrangement the need for a slip clutch is obviated, and the expensive and complex components of the slip clutch are replaced by a simple spring, for example a helical torsion spring. Movement of one end of the spring by the movable member of the operating mechanism causes a bias to be transmitted by the spring and applied to the sleeve via the one way clutch. If the torque produced by this bias is greater than that required to rotate the sleeve relative to the tappet, the sleeve will be rotated and adjustment will occur. If, however, the torque applied is less than that required to rotate the sleeve continued movement of the operating mechanism will simply stress the spring. Accordingly, in an embodiment of the invention incorporated in a disc brake as generally described in the above mentioned British Patent Specification Nos. 1,492,391 and 1,492,392 adjustment of the tappet member will occur in response to friction lining wear, but in the event of caliper deformation due to heavy brake application the friction between the screw threads of the tappet and the sleeve will be too large to permit rotation of the sleeve by the spring, and the spring will be resiliently deformed.

It will be appreciated then that the complex, expensive, and mechanically unsatisfactory components of a slip clutch can be replaced by a single resilient member which can be manufactured cheaply and accurately, which will not deteriorate in use due to slipping wear, and which is substantially unaffected by small amounts of road dirt and moisture.

The above and further features and advantages of the invention will become clear from the following description of preferred embodiments thereof, given by way of example only, reference being had to the accompanying drawings, wherein:

FIG. 2 shows a cross sectional view of part of the brake actuator of FIG. 1;

FIG. 5 is a cross sectional view on the line 5—5 of FIG. 2;

FIG. 6 is a view corresponding to FIG. 2 of an alternative adjusting mechanism;

FIG. 7 is a sectional view on the line VII—VII of FIG. 6; and

FIG. 8 is a plan view of the mechanism of FIG. 6;

Figure 1:
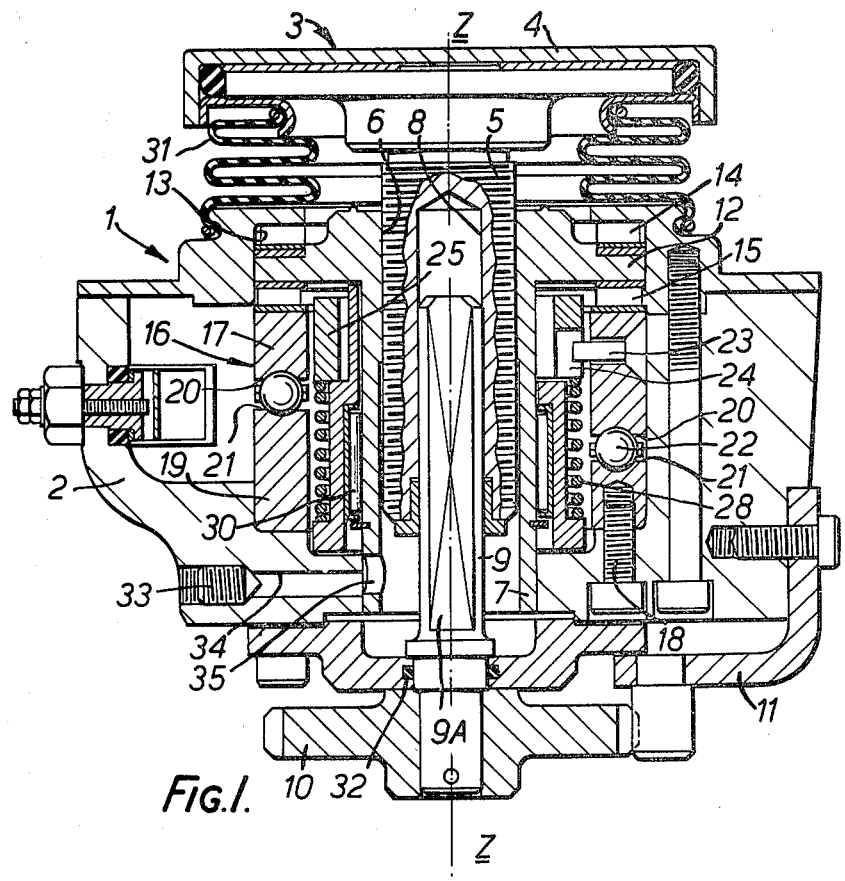
FIG. 1 is a cross sectional view of a brake actuator.

The brake actuator 1 comprises a body 2 and an output tappet 3. In use, upon operation of the brake actuator (as described hereinafter) the tappet 3 moves axially away from the body 2, i.e. in the upward direction as viewed in FIG. 1. The brake actuator is accordingly arranged so that this relative movement applies the friction lining of a brake mechanism to a friction surface. The actuator can, for example, be used in a brake mechanism as generally described in our British Patent Specifications Nos. 1,492,391 and 1,492,392, but its use is not restricted to such application.

The output tappet 3 is generally mushroom shaped and comprises a head 4 for abutting, for example, a brake pad, and a stem 5 which is screw-threaded and is in screw-threaded engagement with a threaded bore 6 in a sleeve member 7. The stem 5 itself includes a hollow axial bore 8 in which is received a pin 9. The pin 9 includes at least one flat 9A which cooperates with a complementary flat on the bore 8 to prevent rotation of the tappet relative to the pin 9. The pin 9 is rotatably mounted in the body 2 and carries at its free end a handwheel 10 which, during normal operation, is secured in position by a bracket 11. Thus, during normal use the pin 9 is fixed relative to the body and accordingly the tappet 3 cannot rotate relative to the body.

The sleeve member 7 includes a flange 12 which is a sliding fit in a bore 13 in the actuator body 2. A spring washer 14 biases the sleeve member 7 downwardly as viewed in FIG. 1 into engagement with a thrust bearing 15 which, advantageously, comprises a plurality of needle rollers.

The thrust bearing 15 is supported on the upper annular face of an operating mechanism 16 comprising a first part 17 rotatable relative to a second part 19 about the axis Z of the stem. The second part 19 is secured to the actuator body 2 by means of a screw 18 and the first and second parts of the operating mechanism 16 include complementary cam surfaces 20,21 separated by a ball bearing 22 such that relative rotation of the first and second parts causes the first part to move axially away from the second part, i.e. upwardly as viewed in FIG. 1. The cam surfaces 20,21 may each be a helical surface as described in the aforementioned British Patent Specification Nos. 1,492,391 and 1,492,392.

An operating rod or cable (not shown) is coupled to the first part 17 of the operating mechanism 16 to provide for rotation of the first part. Such rotation causes the first part to rise as viewed in FIG. 1 and, via the thrust bearing 15, applies an upward force on the sleeve member 7. This upward force causes the sleeve member and output tappet to rise as a unit against the bias of spring washer 14 thereby applying the brake.

Adjustment of the actuator in order to compensate for wear of the friction lining and/or friction surface is accomplished by rotating the sleeve member 7. Since the tappet 3 is fixed against rotation by the pin 9 rotation of the sleeve member 7 will cause axial movement of the tappet 3. Adjustment of the actuator is necessary when, after a predetermined amount of rotation of the first part 17 of the operating mechanism 16 the brakes are not sufficiently applied, i.e. insufficient axial load is being transferred from the thrust bearing 15 to the tappet 3 via the screw-threaded connection between the tappet 3 and the sleeve member 7. The torque required to rotate the sleeve member 7 relative to the tappet 3 will increase as the axial loading on the screw-threaded connection increases, and accordingly the condition when adjustment is necessary can be stated as being when, after a predetermined amount of rotation of the first part 17 of the operating mechanism, the sleeve member can be rotated in the sense to advance the tappet by applying to the sleeve member a torque which is less than a predetermined value T. If no adjustment is necessary after the predetermined amount of rotation of the first part 17, a high axial load will be present on the tappet and accordingly a torque above the predetermined value T would be necessary to rotate the sleeve member. The adjustment is carried out by an adjusting mechanism 26 comprising an output member 29 upon which an input ring 25 is rotatably mounted. A torsion spring 28 has tags located in holes in the input ring and the output member respectively whilst a one-way clutch 30 connects the output member 29 to the sleeve member 7. If the output member 29 is rotated in one direction the clutch 30 will grip and will tend to rotate the sleeve member in that direction. Rotation of the sleeve member 7 in this direction will cause the tappet 3 to advance, i.e. to move upwards as viewed in FIG. 1 to take up slack adjustment. The torsion spring 28 is preloaded by a tongue 36 extending from the input ring 25 into a slot 37 in the output member 29 such that it will transmit a predetermined amount of torque before it permits relative rotation of the input ring and the output member. The pre-load is set such that this predetermined amount of torque corresponds to the predetermined value T referred to above.

Figure 3:
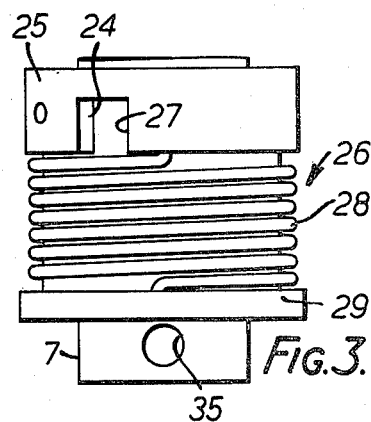
FIGS. 3 and 4 are elevational views of the mechanism of FIG. 2, FIG. 3 being a view in the direction of arrow A of FIG. 4.
Figure 4:
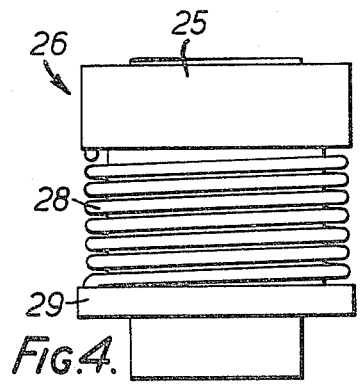

The first part 17 of the operating mechanism is provided with an inwardly extending pin 23 which engages in a slot 24 provided in the input ring 25 of the adjusting mechanism 26, shown in more detail in FIGS. 3 and 4. As can be seen from FIG. 3 the slot 24 has a circumferential extent considerably greater than the pin 23, and accordingly the pin 23 and slot 24 together form a lost motion rotary connection between the first part 17 of the operating mechanism and the input ring of the adjusting mechanism. Accordingly, in use when the first part 17 of the operating mechanism is rotated to apply the brake the pin moves along the slot until it engages one end face of the slot. In the embodiment shown in the drawings, the first part 17 is rotated anti-clockwise when viewed from the tappet end of the actuator in order to apply the brake, and accordingly the pin 23 engages the face 27 of the slot 24 at the end of the lost motion travel. Under normal operating conditions, the brake should be applied at this point and a large axial loading will accordingly be applied to the tappet 3 producing a resistance to rotation of the sleeve member 7 relative to the output tappet 3 sufficiently high to require the application of a torque greater than T to the sleeve member 7 to produce rotation. Under these conditions the spring 28 will not transmit sufficient torque to rotate the sleeve member 7 and accordingly further movement of the pin 23 will cause rotation of the input ring 25 of the adjusting mechanism which is not accompanied by corresponding rotation of the output member 29 of the adjusting mechanism. The output member is, in effect, held fixed in this rotational direction by the one-way clutch 30 and the sleeve member 3. The movement of the input ring 25 will cause "winding up" of the spring 28, i.e. stressing of the spring. When the brakes are subsequently released the input ring 25 will be rotated back to its starting position as spring 28 relaxes. Accordingly, if during heavy braking application the caliper of the brake resiliently deforms over adjustment of the actuator will not occur since at this time the high axial loading applied to the tappet will prevent rotation of the sleeve member 7 about the tappet and any continued rotation of the first part 17 of the operating mechanism will result merely in stressing of the spring 28.

If, however, due to previous friction material wear the brakes are not sufficiently applied when the pin 23 comes into contact with the face 27 and therefore there is no significant resistance to rotation of the sleeve 7 relative to the tappet 3 the sleeve will be rotated to perform adjustment as continued rotation of the first part 17 will cause the pin 23 to entrain the adjusting mechanism 25 and rotate it about the axis Z. Torque will be transmitted through the spring 28 to the output member 29 of the adjusting mechanism and from the output member 29 through the one-way clutch 30 to the sleeve member 7 until the tappet is axially loaded sufficiently for a torque in excess of T to be required to rotate the sleeve member 7 further. The axial loading then applied to the stem 5 of the output tappet will prevent further relative rotation of the sleeve member relative to the output tappet, and braking force will be applied in the usual way upon further rotation of the first part 17 of the operating mechanism. Such further rotation will be accompanied by winding up of the spring 28 as described above.

When the brakes are subsequently released the one-way clutch 30 permits the adjusting mechanism to rotate about the sleeve member 7 without rotating the sleeve member.

It will be appreciated from the above description that the requirement for a slip clutch in the adjusting mechanism has been obviated, and the several components of the slip clutch have been replaced by a simple coil spring.

A rubber gater 31 extends between the tappet 3 and the body 2 of the actuator in order to prevent ingress of road dirt and moisture. An O-ring seal 32 is located between the pin 9 and the body 2 in order to provide a seal therebetween. The actuator mechanism is accordingly sealed against the ingress of dirt and moisture.

When it is desired to replace the friction linings of the brake assembly the bracket 11 is released and handwheel 10 rotated. This in turn rotates the tappet relative to the sleeve member to return the tappet to its starting position. If necessary, a grub screw 33 can be removed in order to allow a suitable rod to be inserted through a bore 34 formed in the body 2 and into an aperture 35 in the sleeve member 7 in order to prevent rotation of the sleeve as the handwheel is rotated.

FIGS. 6 to 8 illustrate a modified form of adjusting mechanism 26A in which the torsion spring 28A is devoid of tags and is secured to the input ring 25A and output member 29A by a friction or interference fit with shoulders 38 and 39 on the input ring 25A and output member 29A respectively. By obviating the need for tags on the torsion spring the possibility of spring failure due to repeated stressing of the tags in use is eliminated. Further, if no tags are used it is not necessary to provide tag receiving holes in the input ring 25A or output member 29A, and accordingly the cost of manufacture is reduced. Conveniently, the torsion spring 28A is a simple coil spring of the type usually used as a compression spring.

It will be noted that in the mechanism 26A the input ring 25A is not rotatably mounted on the output member 29A but is located atop the output member. The input ring is rotationally guided by the outside surface of the sleeve 7. Pre-loading of the spring 28A is provided by a pin 40 which is located in a bore in the input ring and extends into a slot 41 defined by a cut-away portion of the upper end of the sleeve member 7.

In both of the above described embodiments the one-way clutch 30 permits the adjusting mechanism to rotate relative to the sleeve member 7 in order to prevent reverse rotation of the sleeve member 7 after each forward rotation of the sleeve member 7 to take up slack. Ideally the clutch 30 should transmit no torque to the sleeve member 7 during this relative rotation of the adjusting mechanism and the sleeve. It will be appreciated however that in practice the clutch 30 will transmit a small amount of torque to the sleeve member 7 during this phase of operation, and this torque may produce some small reverse rotation of the sleeve member 7. Although any such reverse rotation reduces the efficiency of the adjusting mechanism, the adjusting mechanism will remain sufficiently efficient for most applications. However, if desired such reverse rotation can be substantially completely eliminated by the provision of a second one-way clutch positioned between the sleeve member 7 and the body 2 of the actuator at some suitable location, e.g. at the lower end of the sleeve member as viewed in FIGS. 1 and 6. The second one-way clutch is designed to operate in the opposite sense to the one-way clutch 30 and thereby allows rotation of the sleeve member in the sense to advance the output tappet 3 but prevents reverse rotation. If a second one-way clutch is provided the bore 34 and aperture 35 can be eliminated since the two clutch will act to hold the sleeve member fixed during rotation of the handwheel 10 to reset the output tappet.

I claim:

1. A brake actuator comprising: an output tappet fixed against rotation and having a screw-threaded stem; a sleeve member having an axial screw-threaded bore in screw-threaded engagement with the stem of the output tappet; an operating mechanism comprising a fixed member and a movable member which, upon rotation relative to the fixed member, applies an axial force to the sleeve member to axially advance the sleeve member and the output tappet as a unit; and an adjusting mechanism for rotating the sleeve member relative to the output tappet and thereby advancing the output tappet relative to the sleeve member, the adjusting mechanism including a spring one end of which is movable by the movable member of the operating mechanism and the other end of which is coupled to the sleeve via a one-way clutch capable of driving the sleeve in the direction tending to advance the tappet.

2. A brake actuator according to claim 1 including a lost motion connection between the movable member of the operating mechanism and the spring whereby, upon application of the brake, initial movement of the movable member of the operating mechanism does not produce movement of the said one end of the spring.

3. A brake actuator according to claim 1 or claim 2 wherein the spring is a torsion spring and is pre-loaded to transmit a predetermined level of torque before it resiliently deforms.

4. A brake actuator according to claim 1 or claim 2 wherein the adjusting mechanism includes a tubular output member coupled to the one-way clutch and to the said other end of the spring, and an input ring which is co-axial with the output member and is coupled to the movable member of the operating mechanism and to the said one end of the spring, the spring being a torsion spring which is co-axial with the output member and which is pre-loaded by inter-engaging members on the input ring and the output member.

5. A brake actuator according to claim 4 wherein the input ring is rotatably mounted on the output member and the spring surrounds the output member.

6. A brake actuator according to claim 4 wherein the spring is an interference fit with at least one of the input ring and the output member.

7. A brake actuator according to claims 1 or 2 including means for holding the sleeve fixed and means for rotating the output tappet relative to the sleeve in order to withdraw the output tappet from its advanced position.

8. A brake actuator according to claims 1 or 2 wherein the adjusting mechanism is tubular and the sleeve member extends through the adjusting mechanism.

9. A brake actuator according to claim 1 or 2 including a second one-way clutch restraining the sleeve member against rotation in the sense tending to thdraw the output tappet relative to the sleeve member.

10. A brake mechanism comprising a brake disc, at least one brake pad, and a brake actuator according to claims 1 or 2 arranged to apply the or each brake pad to the disc upon axial advancement of the output tappet by the operating mechanism.

* * * * *